United States Patent [19]

Mashimo et al.

[11] Patent Number: 4,642,082
[45] Date of Patent: Feb. 10, 1987

[54] POWER TRANSMISSION BELT

[75] Inventors: Satoshi Mashimo, Akashi; Hajime Kakiuchi, Itami; Masayoshi Nakajima, Ashiya, all of Japan

[73] Assignee: Mitsuboshi Belting Ltd., Nagata, Japan

[21] Appl. No.: 759,466

[22] Filed: Jul. 26, 1985

[30] Foreign Application Priority Data

Jul. 26, 1984 [JP] Japan ................................ 59-156591

[51] Int. Cl.$^4$ ................................................ F16G 5/06
[52] U.S. Cl. ...................................... 474/260; 198/846
[58] Field of Search ............... 474/260, 263, 264, 268, 474/271; 198/846, 847; 432/239

[56] References Cited

U.S. PATENT DOCUMENTS 2,739,090  3/1956  Waugh ................................ 474/260
2,858,237 10/1958  Walles et al. .................... 198/846 X
3,596,753  8/1971  Knapp ............................. 474/260 X
4,517,332  5/1985  Wada .............................. 198/846 X

FOREIGN PATENT DOCUMENTS 46511   3/1982  Japan .
1574140 9/1980  United Kingdom .

Primary Examiner—Stephen J. Novosad
Assistant Examiner—Thuy M. Bui
Attorney, Agent, or Firm—Wood, Dalton, Phillips, Mason, & Rowe

[57] ABSTRACT

A power transmission belt having a compression portion. The belt is composed of rubber having disposed therein at least approximately 2 to 100 parts by weight of ceramic powder per 100 parts by weight of rubber. The belt provides remarkably improved wear and adhesive resistance without decreased bending resistance.

15 Claims, 4 Drawing Figures

POWER TRANSMISSION BELT

DESCRIPTION

TECHNICAL FIELD

This invention relates to power transmission belts, and in particular to power transmission belts formed of rubber.

BACKGROUND ART

One conventional form of power transmission belt comprises a body portion formed primarily of rubber. Illustratively, the belt may comprise a V-belt, a banded belt, a flat belt, a ribbed belt, etc.

Further conventionally, such belts are provided with longitudinally extending tensile cords, providing strength in the longitudinal direction.

Such belts are utilized in conjunction with grooved pulleys, with the force transmission between the belt and pulley being effected by frictional engagement of the belt with the pulley surface.

In certain drive systems, the belt is reversely bent about one or more pulleys or rollers so that, in normal operation of the system, the belt is bent in opposite directions at different times.

It is important that such belts have high adhesion and crack resistance during both normal and reverse bending thereof so as to have long, troublefree life notwithstanding the transmission of high load forces in the use thereof. More specifically, it is desirable that such belts have high elasticity, high wear resistance in the widthwise direction of the belt, and desirable bending resistance in the longitudinal direction.

It has been found to mix carbon black in the rubber composition in an effort to improve the wear resistance of such belts. Illustratively, a rubber composition, including graphite, in both the compression and tension sections of the belt, is illustrated in U.S. Pat. No. 4,031,768.

It is also known to provide, in the rubber body of the belt, cut fibers of cotton, nylon, polyester, etc., extending laterally of the belt. Such fibers are primarily incorporated in the compression section of the belt.

It is known to provide both the carbon black, or graphite, and cut fibers in the compression and tension sections of the belt in an effort to improve the wear resistance thereof.

A problem arises, however, in the use of increased quantities of carbon black in that, while wear resistance of the belt is improved, greater heat is generated by the flexing of the belt in the normal operation of the drive system, and it is difficult to effect desired increase in the useful life of the belt due to a resultant decrease in the bendability thereof.

Similarly, the use of the cut fibers causes generation of internal heat in the normal use of the belt, with a concurrent decrease in the bendability.

The same undesirable heat generation and decreased bendability characteristics have been found to result from the use of graphite.

Another attempted solution to the problem of providing improved efficiency in the use of such belts in multiple shaft drive systems, has been to provide ribs in the compression section of the belt to provide improved bendability as compared to the conventional V-belt construction. However, it has been found that the use of the ribbed V-belt does not completely solve the problem because of adhesive wear in the compression section rubber where large variations in speed and load occur in the use of the drive system. Under such conditions, the adhesive rubber is bonded to the bottoms of the grooves between the ribs, causing a high slip rate. Under such conditions, power transmission efficiency is reduced and the adhesive rubber becomes successively adhered and laminated, whereby the compression section rubber layer tends to become exfoliated.

In an effort to overcome this problem, it has been conventional to provide relatively large quantities of cut fibers in the compression rubber section, as well as include high structure carbon black particles, to increase the rigidity of the compression section laterally of the belt to minimize adhesive wear.

This attempted solution has again not been found to be completely satisfactory because the elongation of the friction section of the belt in the longitudinal direction decreases, so that bending resistance is reduced with the result that the compression section tends to crack where the belt is reversely bent about idler rollers, pulleys, etc.

Thus, there have been numerous attempts to solve the vexatious problem of providing long, troublefree life of a power transmission belt in drive systems wherein the belt is bent in both directions during the normal operation of the drive. None of the attempted solutions to date has been fully satisfactory.

DISCLOSURE OF INVENTION

The present invention comprehends an improved power transmission belt construction eliminating the disadvantages of the prior art constructions discussed above in a novel and simple manner.

More specifically, the present invention comprehends an improved power transmission belt having greatly improved wear resistance and adhesion resistance, with maintained bending resistance.

The invention comprehends the provision of such a power transmission belt wherein ceramic powder is mixed with the rubber of the compression section to provide such highly desirable improved characteristics.

The invention further comprehends the provision of the ceramic powder in the cushion rubber layer in which the tensile cords are embedded. The invention comprehends the use of a ceramic powder having relatively high hardness and heat resistance in contradistinction to conventional filler materials, such as calcium carbonate, talc, clay, magnesium carbonate, and silica.

The invention comprehends the use of such ceramic powder in power transmission belts as distinguished from conveyor belts wherein load transmitting problems are not found.

The improved power transmission belt construction of the present invention is extremely simple and economical, while yet providing long troublefree life overcoming the disadvantages of the prior art belts discussed above.

BRIEF DESCRIPTION OF THE DRAWING

Other features and advantages of the invention will be apparent from the following description taken in connection with the accompany drawing wherein.

BEST MODE FOR CARRYING OUT THE INVENTION

Figure 1:
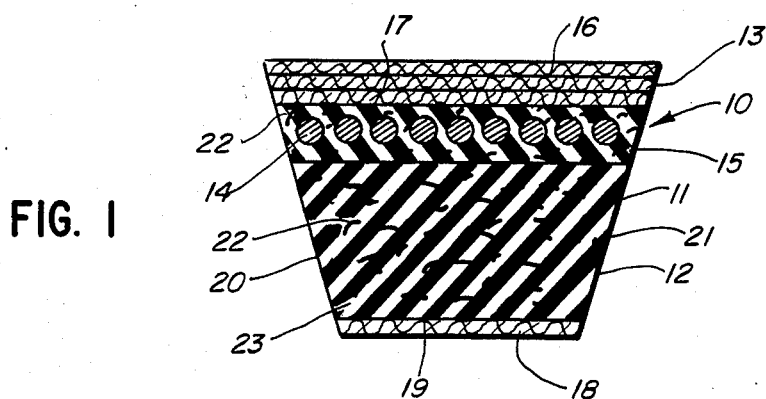
FIG. 1 is a transverse section of a power transmission V-belt embodying the invention.

In the illustrative embodiment of the invention as disclosed in FIG. 1 of the drawing, a power transmission belt generally designated 10 is shown to comprise a V-belt having a rubber body 11 defining an inner compression section 12 and an outer tension section 13. Longitudinally extending, laterally spaced tensile cords 14 are provided in a cushion rubber layer 15 between the compression section 12 and tension section 13.

Tension section 13 may be comprised of a plurality of fabric layers 16 laminated to the outer surface 17 of the cushion rubber layer 15. A fabric layer 18 may be provided on the inner surface 19 of the compression section 12.

V-belt 10 cooperates with a complementary grooved pulley so as to have frictional engagement of the raw side edges 20 and 21 of the V-belt with the pulley in effecting the desired transmission of the power therebetween.

Tensile cords 14 may be formed of conventional construction and, thus, are preferably formed of material providing high strength and low elongation, such as synthetic fibers, including polyester fibers, aromatic polyamide fibers, etc., or glass fibers. The fabric layers 16 comprise rubberized canvas layers in the illustrated embodiment. The cushion rubber layer 15 serves to bond the fabric layered tension section 13 to the compression section 12 and, thus, preferably has high adhesion characteristics.

The invention comprehends the provision of ceramic powder in the rubber portions of the belt normally engaged with the pulley in the operation of the drive system. Thus, as shown in FIG. 1, the rubber of the compression section 12 is provided with a distribution of ceramic powder 22. As the cushion rubber layer 15 may also be engaged with the pulley, the invention comprehends the provision of such ceramic particles also in the cushion rubber layer within the broad scope of the invention.

The invention further comprehends the provision of cut fibers 23 in the compression section extend-transversely of the belt, as illustrated in FIG. 1.

The cut fibers may be formed of suitable conventional material, such as cotton, synthetic fibers such as nylon, polyester, etc., and the like.

The invention comprehends the provision of the ceramic powder in an amount of approximately 2 to 100 parts by weight of the ceramic powder to 100 parts by weight of the rubber. The most preferable range is approximately 5 to 20 parts by weight.

It has been found that where less than 2 parts by weight of the ceramic powder is incorporated, the desirable improved wear resistance and adhesion resistance are not obtained. Alternatively, where more than 100 parts by weight of ceramic powder is provided in the rubber, the Mooney viscosity of the mixture increases so as to cause substantial problems in the manufacture of the belt. By utilizing a composition within the indicated range, substantially improved troublefree life is obtained.

The invention comprehends that the ceramic powder comprise particles in the range of approximately 0.01 to 100 microns diameter. The ceramic powder may comprise silicon carbide, titanium carbide, boron carbide, tungsten carbide, silicon nitride, aluminum nitride, boron, titanium nitride, alumina, zirconia, and Beryllia.

It has been found that the silicon carbide and silicon nitride powders are most efficacious in producing the improved results.

The ceramic powders may be added to the rubber during the kneading step. It has been found desirable to improve the dispersability and reinforcing characteristics of the ceramic powders to include a treating agent, such as a silane coupling agent or titanium coupling agent, prior to the kneading step.

The rubber used in the belt construction may comprise any conventional rubber, such as chloroprene rubber, styrene butadiene rubber, or natural rubber. The rubber formulation may include carbon black, the organic or inorganic cut fibers, a softening agent, an age preventing agent, a working aid, an adhesive aid, and a vulcanization accelerator and/or sulphur. The cushion rubber layer may be formed of a similar rubber, and as indicated above, may also include the ceramic powder.

The mixing of the ceramic powder with the rubber may be carried out by means of a conventional Banbury mixer, a kneader, or calendar rollers in the normal manner. The kneading of the mixture may be accomplished by any conventional method known in the art.

Any suitable method of molding the composition may be employed within the broad scope of the invention, as will be obvious to those skilled in the art. The use of the ceramic powder raises no problems in the molding of the belt.

Figure 2:
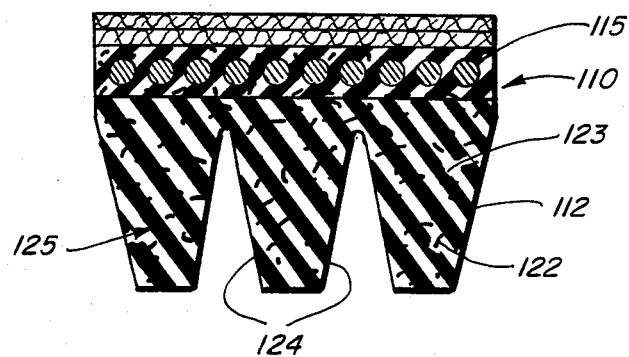
FIG. 2 is a transverse section of a ribbed V-belt embodying the invention.

Referring now to FIG. 2, a modified form of power transmission belt generally designated 110 is shown to comprise a multi-ribbed V-belt wherein the compression section 112 is provided with a plurality of longitudinally extending, inwardly opening annular grooves 124 so as to divide the compression section into a plurality of V-portions generally designated 125. Belt 110 is conventionally referred to as a V-ribbed belt and functions generally similarly to the V-belt 10 discussed above. In V-ribbed belt 110, the compression section is provided with ceramic powder 122 and transversely extending cut fibers 123 similarly to the compression section 12 of belt 10 so as to provide similar improved results in providing long, troublefree life of the banded belt. As discussed above, where the ceramic powder is not utilized in the V-portions, the cushion rubber tends to retain the V-portions and cause slip relative to the pulley, thereby reducing the power transmission efficiency. Further, the use of the ceramic powder effectively prevents exfoliation of the compression section 112 from the cushion rubber layer 115.

Figure 3:
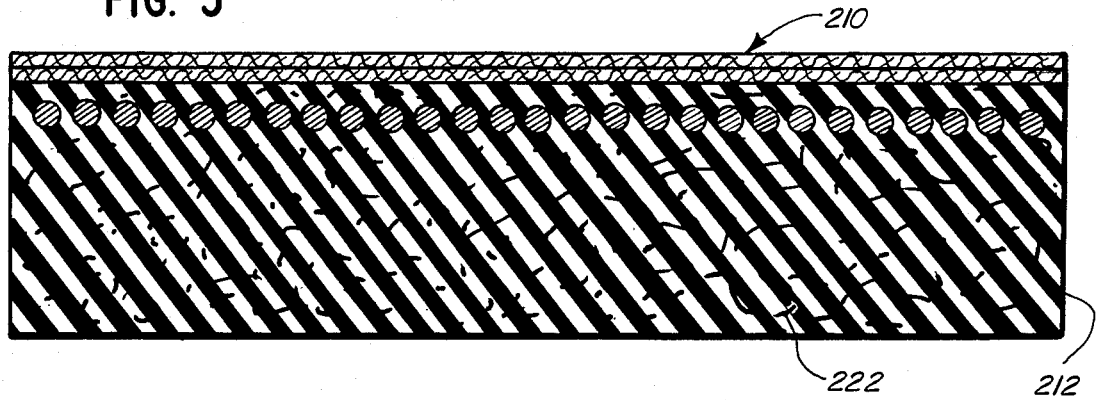
FIG. 3 is a transverse section of a flat belt embodying the invention.

Still another form of power transmission belt embodying the invention is illustrated in FIG. 3 to comprise a flat belt generally designated 210. Flat belt 210 includes a compression section 212 and tension section 213 wherein ceramic powder 222 is distributed similarly as in compression section 12 and tension section 13 of belt 10. Thus, power transmission belt 210 exhibits similar improved longlife characteristics as do V-belt 10 and V-ribbed belt 110.

Figure 4:
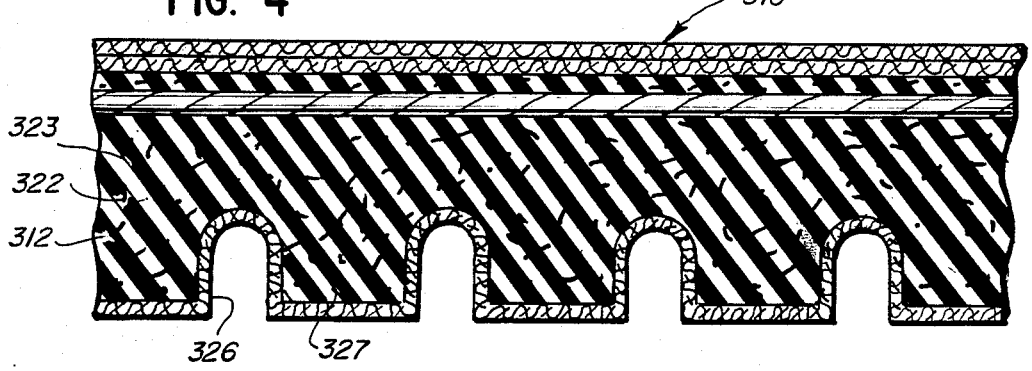
FIG. 4 is a fragmentary longitudinal section of a toothed belt embodying the invention.

In FIG. 4, still another power transmission belt embodying the invention is shown to comprise a toothed belt generally designated 310 wherein the compression section 312 is provided with longitudinally spaced grooves 326, whereby the belt defines a plurality of longitudinally spaced teeth 327 of conventional configuration. However, the compression section 312 is provided with the ceramic powder 322 and cut fibers 323 similarly as in the compression section 12 of belt 10 and, thus, functions in a similar improved manner.

As discussed above, where the power transmission belt is utilized in a drive system wherein reverse bending occurs around one or more rollers or pulleys, the ceramic powder may be distributed in the tension section within the broad scope of the invention.

Each of the modifications of FIGS. 2, 3, and 4 incorporates the improved structural concepts of belt 10 and similar portions thereof are identified by the same reference numerals but 100 different.

A number of power transmission belts manufactured in accordance with the above disclosure were made and tested. Three control belts were made from a rubber formulation as illustrated in the following Table 1 without incorporating the silicon carbide ceramic powder. Two V-belts 10 were constructed from formulations corresponding to Examples 1 and 2 in Table 1, and two V-ribbed belts were constructed in accordance with the formulation of Examples 3 and 4 therein. Three comparison belts were formed in which no ceramic powder was incorporated.

The V-belts 10 of Examples 1 and 2 comprise raw-edge type V-belts having a length of 1015 mm. The canvas layers 16 and 18 comprise canvas layers utilizing rubber/cutton canvas. The tensile members 14 were formed of polyester resin fibers.

In testing the V-belts of Examples 1 and 2, the belts were wound between a drive pulley having 107 mm. diameter and rotating at 3000 rpm, and a driven pulley having 100 mm. diameter. A tension pulley having 70 mm. diameter was urged against the tension section 16 under a driven axis load of 80 ps, 80 kg. at room temperature.

The belts were run for 240 hours and the wear rate determined as by determining the difference in the belt weight before and after the test. The results of the wear test are shown in Table 2 below.

TABLE 1

| | Comparison Example | | | V-belt Examples | | V-ribbed Examples | |
|---|---|---|---|---|---|---|---|
| | A | B | C | 1 | 2 | 3 | 4 |
| Chloroprene rubber | 100 | 100 | 100 | 100 | 100 | 100 | 100 |
| Stearic acid | 1 | 1 | 1 | 1 | 1 | 1 | 1 |
| magnesium oxide | 4 | 4 | 4 | 4 | 4 | 4 | 4 |
| Age preventing agent | 2 | 2 | 2 | 2 | 2 | 2 | 2 |
| processed oil | 5 | 5 | 5 | 5 | 5 | 5 | 5 |
| HAF carbon black | 35 | 50 | 35 | 35 | 35 | 35 | 35 |
| Cut cotton yarn | 20 | 20 | 30 | 20 | 20 | 20 | 20 |
| Silicon carbide powder (1) | | | | 10 | 10 | 10 | 10 |
| Silane coupling agent (2) | | | | | 0.5 | | 0.5 |
| Zinc Oxide | 5 | 5 | 5 | 5 | 5 | 5 | 5 |
| Ethylene thiourea | 0.5 | 0.5 | 0.5 | 0.5 | 0.5 | 0.5 | 0.5 |

(1) 0.6 microns of mean particle size
(2) Gamma-melcaptopropyltrimethoxysilane

TABLE 2

| | Comparison Example | | Example | |
|---|---|---|---|---|
| belt running test | A | B | 3 | 4 |
| 1. wear rate | 8.7% | 6.5% | 5.4% | 4.8% |
| 2. belt life (hrs) (until comp. | 432 | 384 | 480 | 528 |

TABLE 2-continued

| | Comparison Example | | Example | |
|---|---|---|---|---|
| belt running test | A | B | 3 | 4 |
| sec. cracked) | | | | |

With respect to the V-ribbed belts 110, additional characteristics were determined, as illustrated in Table 3.

TABLE 3

| | Comparison Example | | | Example | |
|---|---|---|---|---|---|
| | A | B | C | 1 | 2 |
| Physical properties of rubber | | | | | |
| row parallel direction 10% modulus (kg/cm²) | 100 | 130 | 145 | 115 | 125 |
| row perpendicular direction elongation | 275 | 180 | 160 | 260 | 245 |
| Belt feeding test Presence of feed adhesion 1000 rpm, 6 hr. later | large | small | small | none | none |
| reverse bending feeding belt life (m sec.) | 240 | 175 | 130 | 265 | 285 |

In manufacturing the comparison belts and Example belts 1, 2, 3 and 4, the rubber mixture of Table 1 was first kneaded in a Banbury mixer and then rolled by calendar rollers to orient the short fibers in the transverse direction. The material was then placed in suitable molds and vulcanized at 100° C. for 30 minutes. The belts had a length of 975 mm.

The foregoing disclosure of specific embodiments is illustrative of the broad inventive concepts comprehended by the invention.

We claim:

1. In a power transmission belt having a raw-edged inner compression section, an outer tension section, and a plurality of longitudinally extending tensile cords intermediate said compression and tension sections, the improvements comprising:

said compression section comprising a rubber composition having dispersed therein ceramic powder present in the amount of approximately 2 to 100 parts of ceramic powder to 100 parts of rubber by weight, said ceramic powder being formed of at least one of the group consisting of silicon carbide, titanium carbide, boron carbide, tungsten carbide, silicon nitride, aluminum nitride, boron nitride, titanium nitride, alumina, zirconia, and Beryllia.

2. The power transmission belt of claim 1 wherein said ceramic powder is present solely in said compression layer.

3. The power transmission belt of claim 1 further including a cushion rubber layer intermediate said compression and tension sections, said tensile cords being embedded in said cushion rubber layer, and said cushion rubber layer comprising a rubber composition having dispersed therein ceramic powder present in the amount of approximately 2 to 100 parts of ceramic powder to 100 parts of rubber by weight.

4. The power transmission belt of claim 1 wherein said tension section comprises a rubber composition having dispersed therein ceramic powder present in the amount of approximately 2 to 100 parts of ceramic powder to 100 parts of rubber by weight.

5. The power transmission belt of claim 1 wherein said tension section comprises at least one layer of fabric.

6. The power transmission belt of claim 1 wherein said compression section includes at least one layer of fabric.

7. The power transmission belt of claim 1 wherein the ceramic powder size is in the range of approximately 0.01 to 100 microns.

8. The power transmission belt of claim 1 wherein the rubber in which the ceramic powder is dispersed comprises a rubber selected from the groups consisting of chloroprene rubber, styrene butadiene rubber, and natural rubber.

9. The power transmission belt of claim 1 wherein the rubber in which the ceramic powder is dispersed further includes dispersed therein at least one of carbon black, staple length, transversely extending reinforcing fibers, softening agent, aging inhibitor, working aid oil, adhesion enhancing material, vulcanization accelerator, sulphur, coupling agent, zinc, and ethylene thiourea.

10. The power transmission belt of claim 1 wherein said belt comprises any one of a V-belt, a V-ribbed belt, a banded belt, a cogged belt, and a flat belt.

11. The power transmission belt of claim 1 wherein said tension section comprises fabric impregnated with rubber wherein the rubber comprises a rubber composition having dispersed therein ceramic powder present in the amount of approximately 2 to 100 parts of ceramic powder to 100 parts of rubber by weight.

12. In a power transmission belt having a raw-edged inner compression section, an outer tension section, and a plurality of longitudinally extending tensile cords intermediate said compression and tension sections, the improvement comprising:

said compression section comprising a rubber composition having dispersed therein ceramic powder present in the amount of approximately 2 to 100 parts of ceramic powder to 100 parts of rubber by weight, said ceramic powder being formed of at least one of the group consisting of silicon carbide, titanium carbide, boron carbide, tungsten carbide, silicon nitride, aluminum nitride, boron nitride, titanium nitride, alumina, zirconia, and Beryllia;

said belt including a cushion rubber section intermediate said compression and tension sections, said tensile cords being embedded in said cushion rubber layer, said cushion rubber layer comprising a rubber composition having dispersed therein ceramic powder present in the amount of approximately 2 to 100 parts of ceramic powder to 100 parts of rubber by weight; and said tension section comprising a plurality of layers of rubber impregnated fabric.

13. The power transmission belt of claim 12 wherein said compression section is provided with an inner fabric cover.

14. The power transmission belt of claim 12 wherein said compression section further includes transversely extending staple length fibers.

15. The power transmission belt of claim 12 wherein said tension section includes rubber comprising a composition having dispersed therein ceramic powder present in the amount of approximately 2 to 100 parts of ceramic powder to 100 parts of rubber by weight.

* * * * *